July 10, 1962  E. V. SUNDT  3,043,090
ELECTRIC CLOCK
Filed Aug. 3, 1959  2 Sheets-Sheet 1
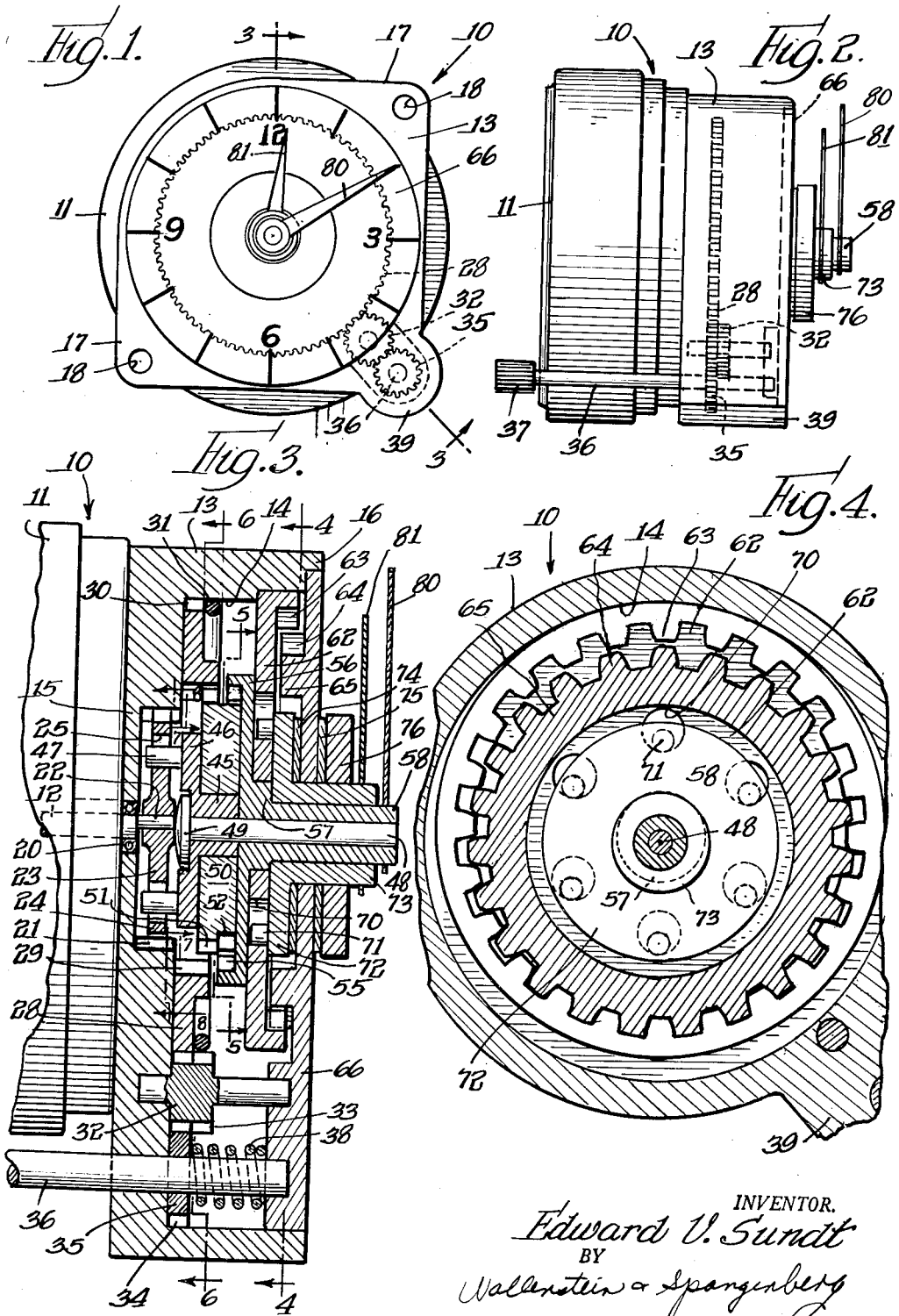
INVENTOR.
Edward V. Sundt
BY
Wallenstein & Spangenberg
attys.

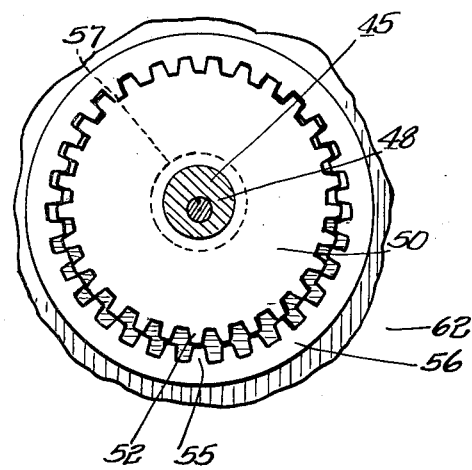
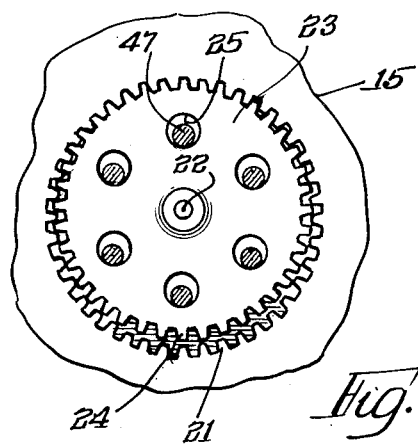
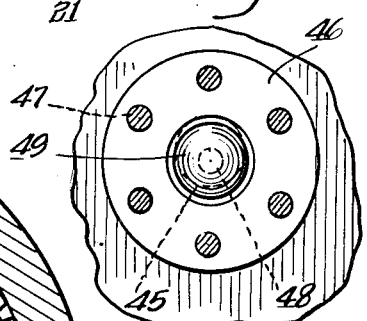
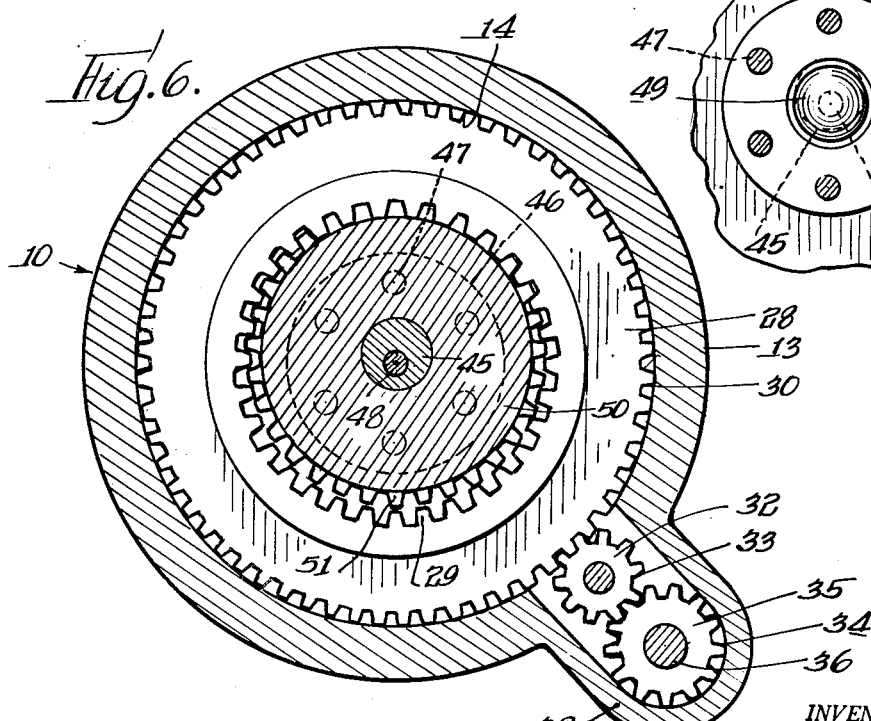

United States Patent Office 3,043,090
Patented July 10, 1962

3,043,090
ELECTRIC CLOCK
Edward V. Sundt, 118 Sterling Lane, Wilmette, Ill.
Filed Aug. 3, 1959, Ser. No. 831,281
12 Claims. (Cl. 58—26)

The principal object of this invention is to provide an improved electric clock, wherein a synchronous electric motor operates through differential gear reducer means for moving the time indicating hands, wherein the parts are all concentrically arranged about a central axis to provide a compact arrangement, wherein a minimum number of parts are utilized to provide a simple, rugged and inexpensive arrangement, and wherein the electric clock includes two separate assemblies which may be separately checked and inspected prior to final assembly and checking to further reduce manufacturing costs.

Briefly, the electric clock of this invention includes a synchronous electric motor rotating its shaft at a synchronous speed. A hollow housing is secured to the electric motor concentrically with the motor shaft with the motor shaft extending into the hollow housing from one end thereof and the other end of the housing being open. A first assembly is arranged within the hollow housing and it includes a first differential gear reducer, concentric with the motor shaft, comprising a first toothed annulus formed in the housing concentrically with the motor shaft, an eccentric on the motor shaft, and a first toothed rotor or output member rotatably mounted on the eccentric and meshing with the first toothed annulus. It also includes a second toothed annulus carried within the hollow housing.

The second assembly includes a closure member for the open end of the housing and second and third differential gear reducers supported by the closure member concentrically with a central axis which is concentric with the motor shaft axis. The second differential gear reducer includes a second eccentric rotatably supported by the closure member, a second rotor rotatably mounted on the second eccentric and having a first ring of teeth adapted to mesh with the second toothed annulus and a second ring of teeth, and a gear member or output member rotatably supported by the closure member and meshing with the second ring of teeth on the second rotor. The third differential gear reducer includes a third eccentric carried by the gear member, a third toothed annulus carried by the closure member, and a third toothed rotor or output member rotatably mounted on the third eccentric and meshing with the third toothed annulus.

When the closure member of the second assembly is secured to the open end of the housing with the second and third differential gear reducers enclosed therein, the first ring of teeth on the second rotor mesh with the second toothed annulus, and a separable coupling means couples the second eccentric of the second differential gear reducer to the first toothed rotor or output member of the first differential gear reducer, the first and second assemblies being thus coupled together for operation.

Indicating means are operated by the gear member or output member of the second differential gear reducer for indicating time in minutes and indicating means are also operated by the third rotor or output member of the third differential gear reducer for indicating time in hours. In this connection, the gear member is provided with an extension extending through the closure member which in turn is provided with a minute hand, and a member coupled to the third toothed rotor also extends through the closure member and is provided with an hour hand. The various parts of the second and third differential gear reducers are preferably held together in assembled relation on the second assembly by a central pin.

Manually operable means carried by the housing are provided for manually rotatably positioning the second toothed annulus for manually manipulating the second differential gear reducer and hence the third differential gear reducer for manually setting the time indications of the electric clock.

Further objects of this invention reside in the details of construction of the electric clock and in the cooperative relationships between the component parts thereof.

Other objects and advantages of this invention will become apparent to those skilled in the art upon reference to the accompanying specification, claims and drawings in which:

FIG. 1 is a front elevation view of the electric clock of this invention;

FIG. 2 is a side elevational view looking from the left of FIG. 1;

FIG. 3 is a vertical sectional view through the electric clock taken substantially along the line 3—3 of FIG. 1;

FIG. 4 is a vertical sectional view taken substantially along the line 4—4 of FIG. 3;

FIG. 5 is a vertical sectional view taken substantially along the line 5—5 of FIG. 3;

FIG. 6 is a vertical sectional view taken substantially along the line 6—6 of FIG. 3;

FIG. 7 is a vertical sectional view taken substantially along the line 7—7 of FIG. 3; and FIG. 8 is a vertical sectional view taken substantially along the line 8—8 of FIG. 3.

The electric clock of this invention is generally designated at 10 and it includes a synchronous electric motor 11 for operating a motor shaft 12 at a synchronous speed, the motor being a conventional motor having high-speed, low-torque characteristics and operating, for example, at a speed of 600 r.p.m. Suitably secured to the electric motor 11 is a housing 13 which is hollow as indicated at 14, which is provided at one end with a transverse wall 15 and which is open at its other end as indicated at 16. The housing may be formed of any suitable material as for example, a synthetic plastic material such as a glass filled phenolic material which may be readily and accurately molded. The housing 13 may be provided with suitable ears 17 having holes 18 therein for mounting purposes. In mounting the housing 13 on the motor 11, a central opening in the wall 15 of the housing receives the external surface of the motor bearing 20 for the shaft 12 so that the housing 13 is accurately concentrically arranged with respect to the axis of rotation of the motor shaft. The wall 15 of the housing is provided with an internal toothed annulus 21 which is accurately concentrically arranged with respect to the axis of rotation of the motor shaft 12 because of the aforementioned manner of mounting the housing on the motor 11.

The motor shaft 12 which extends into the hollow housing 13 is provided with an eccentric in the form of an eccentric pin 22 and rotatably mounted on this eccentric pin 22 is a first rotor 23 having external teeth 24 which mesh with the teeth 21 of a first internal toothed annulus. The rotor may be formed of any suitable material as, for example, a synthetic plastic such as glass filled nylon or the like. The number of teeth 24 on the rotor 23 is 40 teeth and the number of teeth 21 in the first internal annulus is 41. As the eccentric 22 is rotated at 600 r.p.m., the rotor 23 is oscillated thereby and, because of the meshing of the teeth on the rotor and annulus, the rotor 23 is caused to rotate with a 40 to 1 speed reduction at 15 r.p.m. The rotor 23 is provided with a plurality of holes 25 which act as part of a coupling means for transmitting the rotary motion of the rotor 23.

A second internal toothed annulus 28 is rotatably mounted in the interior of the housing 13, this annulus having internal teeth 29. The annulus may be formed of any suitable material such as powdered iron or a suitable synthetic plastic material. The annulus is also provided with external teeth 30. The annulus 28 is secured in place by a spring retainer ring 31. The external teeth 30 on the annulus 28 mesh with teeth 33 on an idler gear 32 mounted for rotation in the housing member 13 and a cover member 66, the idler teeth 33 in turn meshing with teeth 34 on a gear 35 carried by a setting shaft 36 also journalled for rotation in the housing 13 and cover plate 66. The setting shaft 36 extends rearwardly past the electric motor 11 and is provided at its rearward end with a knurled knob 37 for manually rotating the same. A spring 38 presses the gear 35 against the housing 13 so as to provide a friction resistance to rotation thereof. As a result, the internal toothed annulus 28 is normally maintained stationary, but it may be rotatably positioned by manual manipulation of the knob 37. As will be pointed out later, the manual positioning of the internal annulus 28 is for the purpose of setting the time indications of the electric clock. The housing 13 is provided with an extension 39 for accommodating the setting gears 32 and 35.

The foregoing parts form a first assembly which may be accurately checked and inspected following the assembly thereof without having to wait for final assembly before so doing. A second assembly includes a second eccentric 45 formed on a coupling member 46 having pins 47 which are adapted to be received in the holes 25 of the first rotor 23. The eccentric and coupling member 45, 46 is rotatably supported by a pin 48 having a head 49. The eccentric and coupling member 45, 46 may be formed of any suitable synthetic plastic material such as nylon or the like. A second rotor 50 is rotatably mounted on the second eccentric 45 and it is provided with a first ring of external teeth 51 which mesh with the ring of teeth 29 on the second internal annulus 28. The rotor 50 is also provided with a second ring of external teeth 52. The rotor 50 may be formed of any suitable material such as synthetic plastic, powdered iron or the like.

The second ring of teeth 52 on the rotor 50 mesh with internal teeth 54 on a gear member 56 which rotatably receives the pin 48, the gear member 56 also having a third eccentric 57 and a sleeve extension 58. This gear member 56 with its eccentric 57 and extension 58 may be formed of any suitable material such as powdered iron or a synthetic plastic material as, for example, glass filled nylon. As the second eccentric 45 is rotated, the second rotor 50 is oscillated thereby and, due to the meshing of the teeth 29 and 51, the second rotor 50 is also caused to rotate. Also due to the meshing of the teeth 52 and 55, the gear member 56 is caused to rotate. The number of teeth 29 in the internal toothed annulus is (a) 31 teeth, the number of teeth 51 on the rotor 50 is (b) 30 teeth, the number of teeth 52 on the rotor 50 is (c) 29 teeth, and the number of teeth 55 on the gear member 56 is (d) 30 teeth. The speed reduction ratio of this differential gear reducer is determined by the formula $$K = \frac{1}{\frac{ac}{bd}-1} = \frac{1}{\frac{31 \times 29}{30 \times 30}-1} = 900$$

Thus, with the electric motor operating the motor shaft 12 at 600 r.p.m., the eccentric 45 is rotated at 15 r.p.m. and the gear member 56 is rotated at 1 r.p.h. (one revolution per hour).

Rotatably mounted on the third eccentric 57 is a third rotor 62 having a ring of internal teeth 63 which mesh with a ring of external teeth 64 formed on an annulus 65 which in turn is formed on a cover member 66. The third rotor 62 may be formed of any suitable material as, for example, a synthetic plastic material such as glass filled nylon or the like. The closure member 66 may be formed of any suitable material such as die-cast aluminum, powdered brass or the like. The ring of teeth 64 on the annulus 65 is concentric with the axis of the pin 48. The number of teeth 63 on the rotor 62 is 24 teeth and the number of teeth 64 on the toothed annulus 65 is 22 teeth, these numbers of teeth operating to produce a speed reduction ratio of 12 to 1. Thus, as the eccentric 57 is rotated at 1 r.p.h., the rotor 62 is oscillated and is rotated at a speed of 1 r.p. 12 h. (one revolution every 12 hours). The third toothed rotor 62 is provided with a plurality of holes 70 which receive pins 71 carried by a coupling member 72 having a sleeve extension 73 which is journalled for rotation in the cover member 66. Located between the coupling member 72 and the cover member 66 is a thrust washer 74 which may be formed of glass filled Teflon or the like and, likewise, another similar thrust washer 75 is interposed between the cover member 66 and a retainer washer 76 which is secured to the sleeve extension 73, the retaining washer being formed of brass or the like. The coupling member 72 and retaining washer 76 and the associated thrust washers 74 and 75 operate to journal and support the various parts of the second and third differential gear reducers on the cover member 66. After the parts are assembled in the second assembly upon the cover member, a drop of cementitious material such as Loctite is placed upon the sleeve extension 58 adjacent the end of the sleeve extension 73 and upon the pin 48 adjacent the end of the sleeve extension 58 so as to hold all of the parts in assembled relation on the cover member 66. A minute hand 80 is suitably secured to the sleeve extension 58 to be driven thereby for indicating time in minutes, and an hour hand 81 is suitably secured to the sleeve extension 73 to be driven thereby for indicating time in hours. The hands 80 and 81 may cooperate with suitable time indicia such as the time indicia on the cover member 66 as illustrated in FIG. 1.

The second assembly, including the closure member and the parts of the second and third differential gear reducers may be inspected and checked before final assembly of the electric clock. When the closure member 66 is secured in place on the open end 16 of the housing 13, as by a pressed fit or the like, the teeth 51 of the second rotor 50 mesh with the teeth 29 of the second annulus 28, and the pins 47 of the coupling member 46 are received in the holes 25 of the first rotor 23. As a result, the electric motor 11 operates through the first, second and third differential gear reducers to operate the hands 80 and 81 to indicate time in minutes and in hours.

In order to manually set the time indications of the electric clock, the knurled knob 37 is rotated to rotate the second internal toothed annulus 28 in the housing 13 and, when this occurs, the rotor 50 is manually turned about the eccentric to manualy turn the gear member 56 to the desired position as indicated by the minute hand 80. As the gear member 56 of the second differential gear reducer is thus manually manipulated, the rotor 62 and the coupling member 72 of the third differential gear reducer are also manually manipulated by the action of the third eccentric 57 for setting the hour hand 81 to the desired position.

While, for purposes of illustration, one form of the electric clock of this invention has been disclosed, other forms thereof may become apparent to those skilled in the art upon reference to this disclosure and, therefore, this invention should be limited only by the scope of the appended claims.

I claim as my invention:

1. An electric clock comprising a synchronous electric motor including a shaft directly driven by the motor at a synchronous speed, a hollow housing secured to the electric motor concentrically with the motor shaft with the motor shaft extending into the hollow housing from one end thereof and the other end of the housing being open, a first assembly in the hollow housing including a first differential gear reducer concentric with the motor shaft and driven thereby, a second assembly including a closure member for the open end of the housing, a second differential gear reducer centrally supported by the closure member, and a third differential gear reducer driven by the second differential gear reducer supported by the closure member concentrically with the second differential gear reducer, means for securing the closure member of the second assembly to the open end of the hollow housing with the second and third differential gear reducers enclosed therein, separable coupling means for coupling the second differential gear reducer to the first differential gear reducer to be driven thereby when the closure member is secured to the open end of the housing, indicating means operated by the second differential gear reducer for indicating time in minutes, and indicating means operated by the third differential gear reducer for indicating time in hours.

2. An electric clock comprising a synchronous electric motor including a shaft directly driven by the motor at a synchronous speed, a hollow housing secured to the electric motor concentrically with the motor shaft with the motor shaft extending into the hollow housing from one end thereof and the other end of the housing being open and having an internal toothed annulus concentric with the motor shaft, a first assembly including a first differential gear reducer having an eccentric on the motor shaft and a first external toothed rotor rotatably mounted on the eccentric and meshing with the internal toothed annulus, and a second internal toothed annulus carried by the housing concentric with the motor shaft, a second assembly including a closure member for the open end of the housing, a second differential gear reducer having a second eccentric rotatably supported by the closure member, a second rotor rotatably mounted on the second eccentric and having a first ring of external teeth adapted to mesh with the second internal toothed annulus and a second ring of external teeth, and an internal toothed gear member rotatably supported by the closure member concentrically with the axis of rotation of the second eccentric and meshing with the second ring of external teeth on the second rotor, and a third differential gear reducer having a third eccentric carried by the internal toothed gear member, a third rotor rotatably mounted on the third eccentric and provided with internal teeth, and a ring of external teeth carried by the closure member concentrically with the axis of rotation of the third eccentric and meshing with the internal teeth of the third rotor, means for securing the closure member of the second assembly to the open end of the hollow housing with the second and third differential gear reducers enclosed therein and with the first ring of external teeth on the second rotor meshing with the second internal toothed annulus, separable coupling means for coupling the second eccentric to the first external toothed rotor when the closure member is secured to the open end of the housing, indicating means operated by the internal toothed gear member of the second differential gear reducer for indicating time in minutes, and indicating means operated by the third rotor of the third differential gear reducer for indicating time in hours.

3. An electric clock comprising a synchronous electric motor including a shaft directly driven by the motor at a synchronous speed, a hollow housing secured to the electric motor concentrically with the motor shaft with the motor shaft extending into the hollow housing from one end thereof and the other end of the housing being open, a first assembly in the hollow housing including a first differential gear reducer concentric with the motor shaft and driven thereby and having an output member, a second assembly including a closure member for the open end of the housing, a second differential gear reducer centrally supported by the closure member and having an output member extending through the closure member, and a third differential gear reducer driven by the output member of the second differential gear reducer and supported by the closure member concentrically with the second differential gear reducer and having an output member extending through the closure member concentrically with the output member of the second differential gear reducer, means for securing the closure member of the second assembly to the open end of the hollow housing with the second and third differential gear reducers enclosed therein, separable coupling means for coupling the second differential gear reducer to the output member of the first differential gear reducer to be driven thereby when the closure member is secured to the open end of the housing, an indicating hand carried by the extension of the output member of the second differential gear reducer for indicating time in minutes, and an indicating hand carried by the extension of the output member of the third differential gear reducer for indicating time in hours.

4. An electric clock comprising a synchronous electric motor including a shaft directly driven by the motor at a synchronous speed, a hollow housing secured to the electric motor concentrically with the motor shaft with the motor shaft extending into the hollow housing from one end thereof and the other end of the housing being open and having an internal toothed annulus concentric with the motor shaft, a first assembly including a first differential gear reducer having an eccentric on the motor shaft and a first external toothed rotor rotatably mounted on the eccentric and meshing with the internal toothed annulus, and a second internal toothed annulus carried by the housing concentric with the motor shaft, a second assembly including a closure member for the open end of the housing, a second differential gear reducer having a second eccentric rotatably supported by the closure member, a second rotor rotatably mounted on the second eccentric and having a first ring of external teeth adapted to mesh with the second internal toothed annulus and a second ring of external teeth, and an internal toothed gear member rotatably supported by the closure member concentrically with the axis of rotation of the second eccentric and meshing with the second ring of external teeth on the second rotor and provided with an extension extending through the closure member, and a third differential gear reducer having a third eccentric carried by the internal toothed gear member, a third rotor rotatably mounted on the third eccentric and provided with internal teeth, a ring of external teeth carried by the closure member concentrically with the axis of rotation of the third eccentric and meshing with the internal teeth of the third rotor, and a driven member rotatably supported by the closure member concentrically with the axis of rotation of the internal toothed gear member and provided with an extension extending through the closure member, means for securing the closure member of the second assembly to the open end of the hollow housing with the second and third differential gear reducers enclosed therein and with the first ring of external teeth on the second rotor meshing with the second internal toothed annulus, separable coupling means for coupling the second eccentric to the first external toothed rotor when the closure member is secured to the open end of the housing, an indicating hand carried by the extension of the internal toothed gear member for indicating time in minutes, and an indicating hand carried by the extension of the driven member for indicating time in hours.

5. An electric clock comprising a synchronous electric motor including a shaft directly driven by the motor at a synchronous speed, a hollow housing secured to the electric motor concentrically with the motor shaft with the motor shaft extending into the hollow housing from one end thereof and the other end of the housing being open and having a first toothed annulus concentric with the motor shaft, a first assembly including a first differential gear reducer having an eccentric on the motor shaft and a first toothed rotor rotatably mounted on the eccentric and meshing with the first toothed annulus, and a second toothed annulus carried by the housing concentric with the motor shaft, a second assembly including a closure member for the open end of the housing, a second differential gear reducer having a second eccentric rotatably supported by the closure member, a second rotor rotatably mounted on the second eccentric and having a first ring of teeth adapted to mesh with the second toothed annulus and a second ring of teeth, and a toothed gear member rotatably supported by the closure member concentrically with the axis of rotation of the second eccentric and meshing with the second ring of teeth on the second rotor, and a third differential gear reducer having a third eccentric carried by the toothed gear member, a third toothed rotor rotatably mounted on the third eccentric, and a third toothed annulus carried by the closure member concentrically with the axis of rotation of the third eccentric and meshing with the third toothed rotor, means for securing the closure member of the second assembly to the open end of the hollow housing with the second and third differential gear reducers enclosed therein and with the first ring of teeth on the second rotor meshing with the second toothed annulus, separable coupling means for coupling the second eccentric to the first toothed rotor when the closure member is secured to the opened end of the housing, indicating means operated by the gear member of the second differential gear reducer for indicating time in minutes, and indicating means operated by the third toothed rotor of the third differential gear reducer for indicating time in hours.

6. An electric clock comprising a synchronous electric motor including a shaft directly driven by the motor at a synchronous speed, a hollow housing secured to the electric motor concentrically with the motor shaft with the motor shaft extending into the hollow housing from one end thereof and the other end of the housing being open and having a first toothed annulus concentric with the motor shaft, a first assembly including a first differential gear reducer having an eccentric on the motor shaft and a first toothed rotor rotatably mounted on the eccentric and meshing with the first toothed annulus, and a second toothed annulus carried by the housing concentric with the motor shaft, a second assembly including a closure member for the open end of the housing, a second differential gear reducer having a second eccentric rotatably supported by the closure member, a second rotor rotatably mounted on the second eccentric and having a first ring of teeth adapted to mesh with the second toothed annulus and a second ring of teeth, and a toothed gear member rotatably supported by the closure member concentrically with the axis of rotation of the second eccentric and meshing with the second ring of teeth on the second rotor and provided with an extension extending through the closure member, and a third differential gear reducer having a third eccentric carried by the toothed gear member, a third toothed rotor rotatably mounted on the third eccentric, a third toothed annulus carried by the closure member concentrically with the axis of rotation of the third eccentric and meshing with the third toothed rotor, and a driven member rotatably supported by the closure member concentrically with the axis of rotation of the gear member and provided with an extension extending through the closure member, means for securing the closure member of the second assembly to the open end of the hollow housing with the second and third differential gear reducers enclosed therein and with the first ring of teeth on the second rotor meshing with the second toothed annulus, separable coupling means for coupling the second eccentric to the first toothed rotor when the closure member is secured to the opened end of the housing, an indicating hand carried by the extension of the gear member of the second differential gear reducer for indicating time in minutes, and an indicating hand carried by the extension of the driven member of the third differential gear reducer for indicating time in hours.

7. An electric clock comprising a synchronous electric motor including a shaft directly driven by the motor at a synchronous speed, a hollow housing secured to the electric motor concentrically with the motor shaft with the motor shaft extending into the hollow housing from one end thereof and the other end of the housing being open, a first assembly in the hollow housing including a first differential gear reducer concentric with the motor shaft and driven thereby, a second assembly including a closure member for the open end of the housing, a second differential gear reducer centrally supported by the closure member, and a third differential gear reducer driven by the second differential gear reducer supported by the closure member concentrically with the second differential gear reducer, means for securing the closure member of the second assembly to the open end of the hollow housing with the second and third differential gear reducers enclosed therein, separable coupling means for coupling the second differential gear reducer to the first differential gear reducer to be driven thereby when the closure member is secured to the open end of the housing, indicating means operated by the second differential gear reducer for indicating time in minutes, and indicating means operated by the third differential gear reducer for indicating time in hours, and means supported by the housing for manually manipulating the second differential gear reducer and hence the third differential gear reducer for manually setting the time indications of the electric clock.

8. An electric clock comprising a synchronous electric motor including a shaft directly driven by the motor at a synchronous speed, a hollow housing secured to the electric motor concentrically with the motor shaft with the motor shaft extending into the hollow housing from one end thereof and the other end of the housing being open, a first assembly in the hollow housing including a first differential gear reducer concentric with the motor shaft and driven thereby and having an output member, a second assembly including a closure member for the open end of the housing, a second differential gear reducer centrally supported by the closure member and having an output member extending through the closure member, and a third differential gear reducer driven by the output member of the second differential gear reducer and supported by the closure member concentrically with the second differential gear reducer and having an output member extending through the closure member concentrically with the output member of the second differential gear reducer, means for securing the closure member of the second assembly to the open end of the hollow housing with the second and third differential gear reducers enclosed therein, separable coupling means for coupling the second differential gear reducer to the output member of the first differential gear reducer to be driven thereby when the closure member is secured to the open end of the housing, an indicating hand carried by the extension of the output member of the second differential gear reducer for indicating time in minutes, and an indicating hand carried by the extension of the output member of the third differential gear reducer for indicating time in hours, and means supported by the housing for manually manipulating the second differential gear reducer and hence the third differential gear reducer for manually setting the time indications of the electric clock.

9. An electric clock comprising a synchronous electric motor including a shaft directly driven by the motor at a synchronous speed, a hollow housing secured to the electric motor concentrically with the motor shaft with the motor shaft extending into the hollow housing from one end thereof and the other end of the housing being open and having a first toothed annulus concentric with the motor shaft, a first assembly including a first differential gear reducer having an eccentric on the motor shaft and a first toothed rotor rotatably mounted on the eccentric and meshing with the first toothed annulus, and a second toothed annulus carried by the housing concentric with the motor shaft, a second assembly including a closure member for the open end of the housing, a second differential gear reducer having a second eccentric rotatably supported by the closure member, a second rotor rotatably mounted on the second eccentric and having a first ring of teeth adapted to mesh with the second toothed annulus and a second ring of teeth, and a toothed gear member rotatably supported by the closure member concentrically with the axis of rotation of the second eccentric and meshing with the second ring of teeth on the second rotor, and a third differential gear reducer having a third eccentric carried by the toothed gear member, a third toothed rotor rotatably mounted on the third eccentric, and a third toothed annulus carried by the closure member concentrically with the axis of rotation of the third eccentric and meshing with the third toothed rotor, means for securing the closure member of the second assembly to the open end of the hollow housing with the second and third differential gear reducers enclosed therein and with the first ring of teeth on the second rotor meshing with the second toothed annulus, separable coupling means for coupling the second eccentric to the first toothed rotor when the closure member is secured to the opened end of the housing, indicating means operated by the gear member of the second differential gear reducer for indicating time in minutes, and indicating means operated by the third toothed rotor of the third differential gear reducer for indicating time in hours, and means supported by the housing for manually rotatably positioning the second toothed annulus for manually manipulating the second differential gear reducer and hence the third differential gear reducer for manually setting the time indications of the electric clock.

10. An electric clock comprising a synchronous electric motor including a shaft directly driven by the motor at a synchronous speed, a hollow housing secured to the electric motor concentrically with the motor shaft with the motor shaft extending into the hollow housing from one end thereof and the other end of the housing being open and having a first toothed annulus concentric with the motor shaft, a first assembly including a first differential gear reducer having an eccentric on the motor shaft and a first toothed rotor rotatably mounted on the eccentric and meshing with the first toothed annulus, and a second toothed annulus carried by the housing concentric with the motor shaft, a second assembly including a closure member for the open end of the housing, a second differential gear reducer having a second eccentric rotatably supported by the closure member, a second rotor rotatably mounted on the second eccentric and having a first ring of teeth adapted to mesh with the second toothed annulus and a second ring of teeth, and a toothed gear member rotatably supported by the closure member concentrically with the axis of rotation of the second eccentric and meshing with the second ring of teeth on the second rotor and provided with an extension extending through the closure member, and a third differential gear reducer having a third eccentric carried by the toothed gear member, a third toothed rotor rotatably mounted on the third eccentric, a third toothed annulus carried by the closure member concentrically with the axis of rotation of the third eccentric and meshing with the third toothed rotor, and a driven member rotatably supported by the closure member concentrically with the axis of rotation of the gear member and provided with an extension extending through the closure member, means for securing the closure member of the second assembly to the open end of the hollow housing with the second and third differential gear reducers enclosed therein and with the first ring of teeth on the second rotor meshing with the second toothed annulus, separable coupling means for coupling the second eccentric to the first toothed rotor when the closure member is secured to the opened end of the housing, an indicating hand carried by the extension of the gear member of the second differential gear reducer for indicating time in minutes, and an indicating hand carried by the extension of the driven member of the third differential gear reducer for indicating time in hours, and means supported by the housing for manually rotatably positioning the second toothed annulus for manually manipulating the second differential gear reducer and hence the third differential gear reducer for manually setting the time indications of the electric clock.

11. In an electric clock, a hollow housing open at one end and having a toothed annulus therein, an assembly including a closure member secured to the open end of the hollow housing, a first differential gear reducer having a driving eccentric rotatable about a central axis concentric with the toothed annulus, a rotor rotatably mounted on the eccentric and having a first ring of teeth meshing with the toothed annulus and a second ring of teeth, and a gear member rotatable about said central axis and meshing with the second ring of teeth on the rotor, a second differential gear reducer having an eccentric carried by the gear member for rotation about said central axis, a toothed rotor rotatably mounted on the eccentric, and a toothed annulus on the closure member concentric with said central axis and meshing with the toothed rotor, means for rotatably supporting the driving eccentric and the gear member and eccentric on the closure member including a pin extending along the central axis on which the driving eccentric and the gear member and eccentric are mounted and by which the driving eccentric, rotor gear member and eccentric, toothed rotor, and closure member are held in assembled relation, indicating means operated by the gear member and eccentric for indicating time in minutes, and indicating means operated by the toothed rotor for indicating time in hours.

12. In an electric clock, a hollow housing open at one end and having a toothed annulus therein, an assembly including a closure member secured to the open end of the hollow housing, a first differential gear reducer having a driving eccentric rotatable about a central axis concentric with the toothed annulus, a rotor rotatably mounted on the eccentric and having a first ring of teeth meshing with the toothed annulus and a second ring of teeth, and a gear member rotatable about said central axis and meshing with the second ring of teeth on the rotor and provided with a sleeve extension extending through the closure member, a second differential gear reducer having an eccentric carried by the gear member for rotation about said central axis, a toothed rotor rotatably mounted on the eccentric, a toothed annulus on the closure member concentric with said central axis and meshing with the toothed rotor, and a driven member concentric with said central axis and coupled to the toothed rotor and provided with a sleeve extension which receives the sleeve extension of the gear member and which extends through and is rotatably supported by the closure member, a pin extending along the central axis and through the driving eccentric and the gear member and its extension by which they are mounted and by which the driving eccentric, rotor, gear member, toothed rotor, driven member and closure member are held in assembled relation, an indicating hand carried by the sleeve extension of the gear member for indicating time in minutes, and an indicating hand carried by the sleeve extension of the driven member for indicating time in hours.

References Cited in the file of this patent
UNITED STATES PATENTS

| | | |
|---|---|---|
| 2,556,110 | Sanborn | June 5, 1951 |
| 2,700,272 | Trichel | Jan. 25, 1955 |
| 2,821,063 | Sundt | Jan. 28, 1958 |